US009967867B2

(12) United States Patent
Wang et al.

(10) Patent No.: US 9,967,867 B2
(45) Date of Patent: *May 8, 2018

(54) UL CONTROL CHANNEL CONSIDERATION FOR HETEROGENEOUS NETWORKS

(71) Applicant: TELEFONAKTIEBOLAGET LM ERICSSON (PUBL), Stockholm (SE)

(72) Inventors: Yi-Pin Eric Wang, Fremont, CA (US); Erik Larsson, Uppsala (SE); Michael Samuel Bebawy, Santa Clara, CA (US); Zhang Zhang, Beijing (CN); Peter von Wrycza, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/445,354

(22) Filed: Feb. 28, 2017

(65) Prior Publication Data

US 2017/0171858 A1    Jun. 15, 2017

Related U.S. Application Data

(63) Continuation of application No. 15/028,664, filed as application No. PCT/IB2015/050972 on Feb. 9, 2015, now Pat. No. 9,622,196.

(Continued)

(51) Int. Cl.
*H04W 4/00* (2009.01)
*H04W 72/04* (2009.01)
(Continued)

(52) U.S. Cl.
CPC ..... *H04W 72/0413* (2013.01); *H04W 52/143* (2013.01); *H04W 52/241* (2013.01);
(Continued)

(58) Field of Classification Search
None
See application file for complete search history.

(56) References Cited

U.S. PATENT DOCUMENTS

2010/0254324 A1* 10/2010 Van Lieshout ..... H04W 52/286
370/329
2012/0287965 A1 11/2012 Sambhwani
(Continued)

FOREIGN PATENT DOCUMENTS

WO    2010/051514 A1    5/2010

OTHER PUBLICATIONS

Qualcomm Inc.: "Solutions for UL/DL imbalances in Hetnets;" 3GPP Draft; R1-131576; vol. RAN WG1; Chicago, IL, US; Apr. 6, 2013.

(Continued)

*Primary Examiner* — Otis L Thompson, Jr.

(57) ABSTRACT

A method in a network node comprises providing to a user equipment a dedicated physical control channel (DPCCH), the DPCCH having an associated first fractional dedicated physical channel (F-DPCH) for conveying transmit power control commands to the user equipment for power controlling the DPCCH, and providing to the user equipment a secondary dedicated physical control channel (S-DPCCH), the S-DPCCH comprising an uplink control channel for communicating transmit power control commands, the S-DPCCH having an associated second F-DPCH for conveying transmit power control commands to the user equipment for power controlling the S-DPCCH. The method comprises receiving, from the user equipment, a downlink transmit power control command, the downlink transmit power control command carried on the S-DPCCH; and controlling a transmit power of the second F-DPCH asso- (Continued)

ciated with the S-DPCCH based on the downlink transmit power control command carried on the S-DPCCH.

30 Claims, 10 Drawing Sheets

Related U.S. Application Data

(60) Provisional application No. 61/938,077, filed on Feb. 10, 2014.

(51) Int. Cl.
  *H04W 52/32* (2009.01)
  *H04W 52/14* (2009.01)
  *H04W 52/24* (2009.01)

(52) U.S. Cl.
  CPC ....... *H04W 52/325* (2013.01); *H04W 72/042* (2013.01); *H04W 72/0473* (2013.01)

(56) References Cited

U.S. PATENT DOCUMENTS

| | | | |
|---|---|---|---|
| 2013/0010704 A1* | 1/2013 | Kronquist | H04W 52/38 370/329 |
| 2013/0034092 A1* | 2/2013 | Lampinen | H04W 56/003 370/350 |
| 2013/0229906 A1* | 9/2013 | Akkarakaran | H04L 5/0044 370/216 |
| 2013/0260814 A1 | 10/2013 | Bergman | |
| 2015/0289212 A1 | 10/2015 | Januszewski | |
| 2016/0029322 A1 | 1/2016 | Cozzo | |
| 2017/0099642 A1* | 4/2017 | Zhang | H04W 52/40 |

OTHER PUBLICATIONS

Ericsson, et al.: "Remaining design considerations for CLTD;" 3GPP Draft; R1-111750; vol. RAN WG1; Barcelona, Spain; May 7, 2011.

3GPP TR 25.800 V12.1.0; 3rd Generation Partnership Project; Technical Specification Group Radio Access Network; Study on UMTS heterogeneous networks (Release 12); Dec. 2013.

Qualcomm Incorporated, "Solutions for UL/DL imbalances in Hetnets", 3GPP Draft, R1131576 Solutions for UL-DL imbanraces in Hetnets, 3rd Generation Partnership Project (3GPP), Mobile Competence Centre, Chicago, USA, Apr. 15-19, 2013.

Ericsson et al., "Remaining design considerations for CLTD", 3GPP Draft, R1-111750 Remaining Design considerations for CLTD, 3rd Generation Partnership Project (3GPP), Mobile Competence Centre, Barcelona, Spain, May 9-13, 2011.

The Communication dated Dec. 8, 2017 issued by EPO for the counterpart EP patent application No. 171497434.8.

* cited by examiner

UL CONTROL CHANNEL CONSIDERATION FOR HETEROGENEOUS NETWORKS

RELATED APPLICATIONS

This application is a continuation of U.S. application Ser. No. 15/028,664, filed Apr. 11, 2016, which is a National Phase Entry of PCT/IB2015/050972, filed Feb. 9, 2015, which claims the benefit of U.S. Provisional Application No. 61/938,077, filed Feb. 10, 2014, the disclosures of which are fully incorporated herein by reference.

TECHNICAL FIELD

The present disclosure relates, in general, to wireless communications and, more particularly, to uplink control channel transmissions in heterogeneous networks.

BACKGROUND

In a wireless network, a wireless device may communicate with one or more radio network nodes to send and/or receive information, such as voice traffic, data traffic, control signals, and so on. In some cases, the wireless device may have a connection with multiple radio network nodes of different link quality. A problem may arise where important control information is to be transmitted to the wireless device, but the link quality with a particular radio network node is weak. For example, in a Wideband Code Division Multiple Access (WCDMA) system, a wireless device in soft handover (SHO) is essentially power-controlled by the best uplink (UL) cell. If the best UL is a non-serving cell, it may be difficult to ensure that important control information is reliably received at the serving cell. The problem of weak communication links becomes particularly pronounced when the imbalance between the best UL and downlink (DL) becomes large, such as for heterogeneous networks or multi-flow operation.

Deployment of low-power nodes (LPNs) is seen as a powerful tool to meet the ever-increasing demand for mobile broadband services. A LPN may correspond, for example, to a remote radio unit (RRU), pico, or micro base station. Deployment of LPNs may allow expansion of network capacity in a cost-efficient way. A network consisting of traditional macro NodeBs and LPNs is referred to as a heterogeneous network. Heterogeneous network deployment may be particularly useful in situations where there are coverage holes, as well as for capacity enhancement for localized traffic hotspots.

FIG. 1 is a block diagram illustrating an embodiment of a network 100. Network 100 includes one or more wireless devices 110, radio network nodes 115, radio network controller 120, and core network node 130. Network 100 may be any suitable type of network. For example, network 100 may be a heterogeneous network of the kind described above, and network nodes 115 may be a mixture of macro nodes and LPNs. Wireless device 110 may communicate with a radio network node 115 over a wireless interface. For example, wireless device 110 may transmit wireless signals to radio network node 115 and/or receive wireless signals from radio network node 115. The wireless signals may contain voice traffic, data traffic, control signals, and/or any other suitable information.

Radio network node 115 may interface with radio network controller 120. Radio network controller 120 may control radio network node 115 and may provide certain radio resource management functions, mobility management functions, and/or other suitable functions. Radio network controller 120 may interface with core network node 130. In certain embodiments, radio network controller 120 may interface with core network node 130 via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, core network node 130 may manage the establishment of communication sessions and various other functionality for wireless device 110. Wireless device 110 may exchange certain signals with core network node 130 using the non-access stratum layer. In non-access stratum signaling, signals between wireless device 110 and core network node 130 may be transparently passed through the radio access network. Example embodiments of wireless device 110, radio network node 115, and a network node (such as radio network controller 120 or core network node 130) are described with respect to FIGS. 8, 9, and 10, respectively.

Wireless device 110 may communicate with multiple radio network nodes 115. The communication links between wireless device 110 and radio network nodes 115 may be of differing quality. Where important control information is to be transmitted to wireless device 110, but the link quality with a particular radio access node is weak, certain techniques may be used to ensure receipt of the control information.

Soft handover (SHO), also referred to as macro diversity, and fast closed-loop power control are essential features of WCDMA and High Speed Packet Access (HSPA). FIG. 2 illustrates a traditional HSPA deployment scenario with two radio network nodes 115A and 115B having similar transmit power levels, in accordance with certain embodiments. For example, network nodes 115A and 115B may both be macro nodes with similar transmit power levels. Ideally, UE 110A moving from serving cell 115A towards non-serving cell 115B would enter the SHO region at point A 204. At point B 206, a serving cell change would occur. During a serving cell change, the non-serving cell becomes the serving cell and vice versa. For example, during a serving cell change macro node 115A, the current serving cell, would become the non-serving cell, and the current non-serving cell 115B would become the serving cell. At point C 208, UE 110A would leave the SHO region.

A radio network controller, such as radio network controller 120 described above in relation to FIG. 1, is in control of reconfigurations. This may imply rather long delays for performing a cell change. During SHO, UE 110A is power-controlled by the best uplink cell. In the scenario illustrated in FIG. 2, network nodes 115A and 115B have roughly the same transmit power, so the optimal DL and UL cell borders will coincide, i.e., the path loss from UE 110A to network nodes 115A and 115B will be equal at point B 206. Hence, in an ideal setting, and from a static (long-term fading such as shadowing) point of view, the serving cell 115A would always have the best uplink. In practice, however, due to imperfections (e.g., reconfiguration delays) and fast fading, UE 110A might be power controlled by non-serving cell 115B during SHO. In such a case, problems may arise due to the weaker link between serving cell 115A and UE 110A. For example, receiving essential control channel information, such as hybrid automatic repeat request (HARQ) positive acknowledgement/negative acknowledgement (ACK/NACK) feedback for HSDPA and scheduling information for Enhanced Uplink (EUL), in serving cell 115A may be problematic. Furthermore, downlink transmit power control (TPC) commands need to be received in serving cell 115A in order for serving cell 115A to set the transmit power level of the fractional dedicated physical channel (F-DPCH), which carries the uplink TPC commands.

FIG. 3 illustrates a HSPA deployment scenario with two radio network nodes 115A, 115B having different transmit power levels, in accordance with certain embodiments. In FIG. 3, radio network node 115A is a macro node, and radio network node 115B is a LPN. Since macro node 115A and LPN 115B have different transmit power levels, the UL and downlink (DL) cell borders may not necessarily coincide. For example, wireless device 110A has a smaller path loss to LPN 115B, while the strongest received power is from macro node 115A. In such a scenario, the UL is better served by LPN 115B, while the DL is provided by serving macro node 115A.

In FIG. 3, the region between the equal path loss border and equal downlink received power (e.g., common pilot channel (CPICH) receive power) border may be referred to as an imbalance region. In the imbalance region, some fundamental problems may be encountered. For example, wireless device 110A in position A 302 would have macro node 115A as the serving cell, but be power controlled towards LPN 115B. Due to the UL-DL imbalance, the UL towards serving macro node 115A may be very weak. In such circumstances, important control information might not be reliably decoded in serving cell 115A.

This problem may be addressed to some extent by utilizing available RNC based cell selection offset parameters. By tuning the Cell Individual Offset (CIO) parameter, the handover border can be shifted towards the optimal UL border. Similarly, the IN_RANGE and OUT_RANGE parameters may be adjusted in order to extend the SHO region.

FIG. 4 illustrates SHO operation for HSPA in a heterogeneous deployment with range extension, in accordance with certain embodiments. Like FIG. 3, FIG. 4 includes two radio network nodes 115A and 115B having different transmit power levels. More particularly, radio network node 115A is a macro node, and radio network node 115B is a LPN. FIG. 4 illustrates the effect of adjustments to the CIO parameter described above. While the adjustments to the CIO parameter may be beneficial from a system performance point of view, in certain heterogeneous networks the power difference between macro node 115A and LPN 115B may be more than 10 dB. In practice, it is unlikely the CIO parameter will be set to more than 6 dB due to considerations such as DL signaling cost in terms of radio resource consumption. As a result, the imbalance region may not be eliminated by means of CIO setting.

Possible solutions to the above described problems may include increasing the gain factors by means of RRC signalling, utilizing repetition or relying on HARQ. Note, however, that possible imbalances between UL and DL in a macro only network are mainly caused by fast fading in a traditional deployment, whereas for other scenarios, such as heterogeneous networks, other factors make the imbalance more pronounced. Thus, the possible solutions mentioned above may be less effective in a heterogeneous network.

During RAN#56 in September 2012, a study item (SI) was initiated on UMTS Heterogeneous Networks. During the SI, many solutions were proposed to address the problem of scheduling information and HS-DPCCH reception in the serving cell for UEs in the imbalance region having the macro as the serving cell (region B described above in FIG. 4). One proposed solution is to provide a new secondary pilot channel (S-DPCCH) in the uplink.

SUMMARY

To address the foregoing problems with existing solutions, disclosed is a method in a network node. The method comprises providing to a user equipment a dedicated physical control channel (DPCCH), the DPCCH having an associated first fractional dedicated physical channel (F-DPCH) for conveying transmit power control commands to the user equipment for power controlling the DPCCH. The method further comprises providing to the user equipment a secondary dedicated physical control channel (S-DPCCH), the S-DPCCH comprising an uplink control channel for communicating transmit power control commands, the S-DPCCH having an associated second F-DPCH for conveying transmit power control commands to the user equipment for power controlling the S-DPCCH. The method further comprises receiving, from the user equipment, a downlink transmit power control command, the downlink transmit power control command carried on the S-DPCCH, and controlling a transmit power of the second F-DPCH associated with the S-DPCCH based on the downlink transmit power control command carried on the S-DPCCH.

In certain embodiments, the network node may be a serving cell. The method may further comprise controlling a transmit power of the first F-DPCH associated with the DPCCH based on the downlink transmit power control command carried on the S-DPCCH. The method may comprise receiving additional control signaling on the S-DPCCH. The S-DPCCH may be power controlled only by the network node. The S-DPCCH may be the phase reference for one or more channels and/or the basis for setting the transmit power or amplitude level for one or more channels. The method may further comprise communicating to the user equipment an uplink transmit power control command on a downlink connection with the user equipment.

The uplink transmit power control command may be for power controlling the S-DPCCH. Also disclosed is a network node. The network node comprises one or more processors. The one or more processors are configured to provide to a user equipment a dedicated physical control channel (DPCCH), the DPCCH having an associated first fractional dedicated physical channel (F-DPCH) for conveying transmit power control commands to the user equipment for power controlling the DPCCH. The one or more processors are configured to provide to the user equipment a secondary dedicated physical control channel (S-DPCCH), the S-DPCCH comprising an uplink control channel for communicating transmit power control commands, the S-DPCCH having an associated second F-DPCH for conveying transmit power control commands to the user equipment for power controlling the S-DPCCH. The one or more processors are configured to receive, from the user equipment, a downlink transmit power control command, the downlink transmit power control command carried on the S-DPCCH, and to control a transmit power of the second F-DPCH associated with the S-DPCCH based on the downlink transmit power control command carried on the S-DPCCH.

Also disclosed is a method in a user equipment. The method comprises receiving provisioning by a network node of a dedicated physical control channel (DPCCH), the DPCCH having an associated first fractional dedicated physical channel (F-DPCH) for conveying transmit power control commands to the user equipment for power controlling the DPCCH. The method further comprises receiving provisioning by the network node of a secondary dedicated physical control channel (S-DPCCH), the S-DPCCH comprising an uplink control channel for communicating transmit power control commands, the S-DPCCH having an associated second F-DPCH for conveying transmit power control commands to the user equipment for power controlling the S-DPCCH. The method further comprises communicating, to the network node, a downlink transmit power control command, the downlink transmit power control command carried on the S-DPCCH.

In certain embodiments, the downlink transmit power control command carried on the S-DPCCH may be a first downlink transmit power control command, the first downlink transmit power control command used by the network node for controlling a transmit power of the second F-DPCH, and the method may further comprise determining the first downlink transmit power control command based at least in part on one or more of a power, a signal-to-interference ratio, and a signal-to-interference-and-noise ratio of the second F-DPCH. In certain embodiments, the method may further comprise determining a second downlink transmit power control command based at least in part on one or more of a power, a signal-to-interference ratio, and a signal-to-interference-and-noise ratio of a third F-DPCH associated with the DPCCH and transmitted by a second network node. The second downlink transmit power control command may be used by the second network node for controlling a transmit power of the third F-DPCH. The method may further comprise communicating, to the second network node, the second downlink transmit power control command, the second downlink transmit power control command carried on the DPCCH.

In certain embodiments, the network node may be a serving cell, and the second network node may be a non-serving cell. The method may further comprise receiving an uplink transmit power control command on a downlink connection with the network node, the uplink transmit power control command for power controlling the S-DPCCH. The S-DPCCH may be used to carry additional control signaling, and may be power controlled only by the network node. The S-DPCCH may be the phase reference for one or more channels and/or the basis for setting the transmit power or amplitude level for one or more channels.

Also disclosed is a user equipment. The user equipment comprises one or more processors. The one or more processors are configured to receive provisioning by a network node of a dedicated physical control channel (DPCCH), the DPCCH having an associated first fractional dedicated physical channel (F-DPCH) for conveying transmit power control commands to the user equipment for power controlling the DPCCH. The one or more processors are configured to receive provisioning by the network node of a secondary dedicated physical control channel (S-DPCCH), the S-DPCCH comprising an uplink control channel for communicating transmit power control commands, the S-DPCCH having an associated second F-DPCH for conveying transmit power control commands to the user equipment for power controlling the S-DPCCH. The one or more processors are configured to communicate, to the network node, a downlink transmit power control command, the downlink transmit power control command carried on the S-DPCCH.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Particular embodiments are described in FIGS. 1-10 of the drawings, like numerals being used for like and corresponding parts of the various drawings.

As described above, problems may arise where important control information is to be transmitted to a wireless device, but the link quality with a particular radio network node is weak. The problem of weak communication links becomes particularly pronounced when the imbalance between the best UL and downlink (DL) becomes large, such as for heterogeneous networks or multi-flow operation. Heterogeneous network deployment may be particularly useful in situations where there are coverage holes, as well as for capacity enhancement for localized traffic hotspots. The present disclosure contemplates various embodiments that may improve reception of control information.

Figure 1:
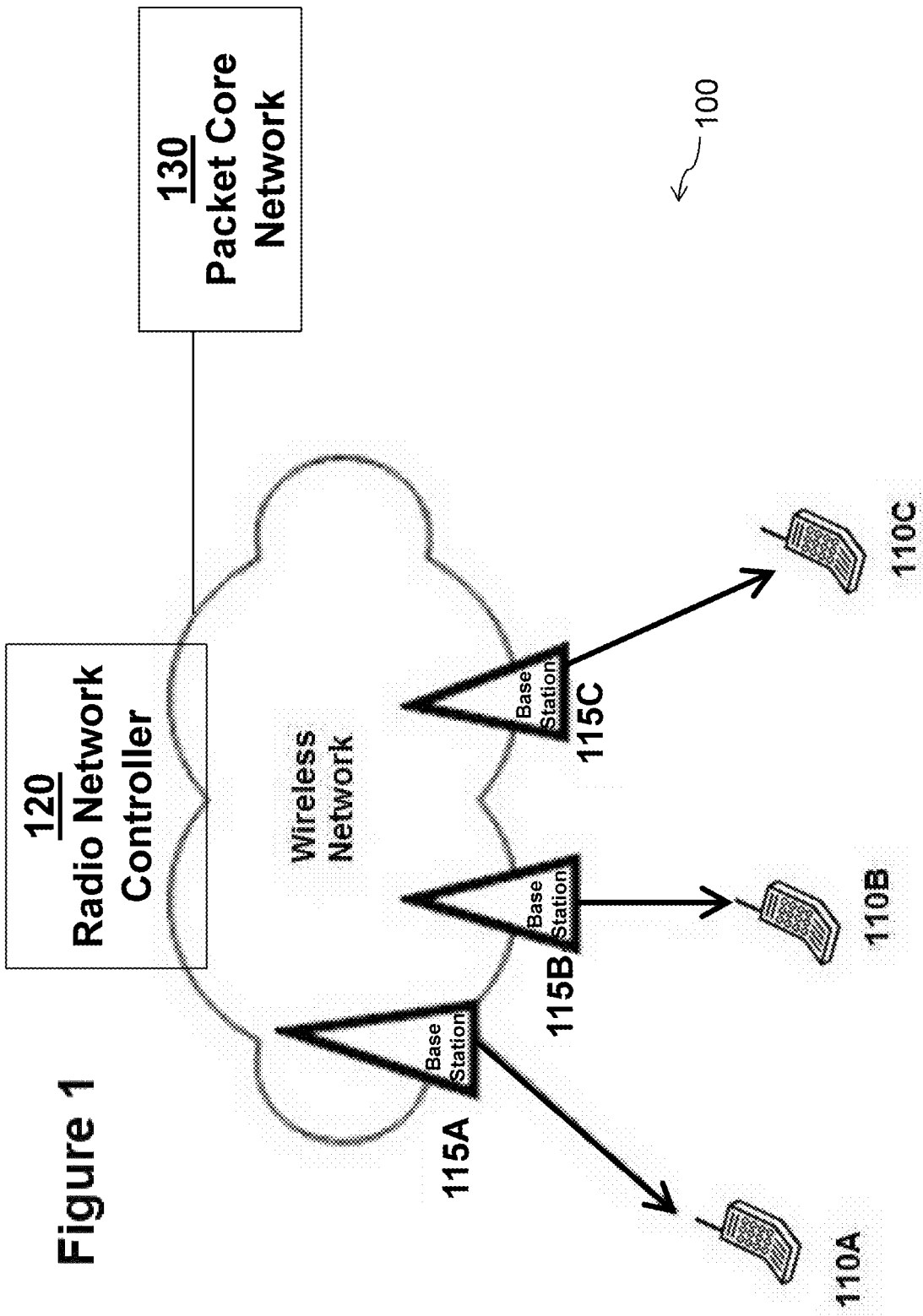
FIG. 1 is a block diagram illustrating an embodiment of a network, in accordance with certain embodiments.
Figure 2:
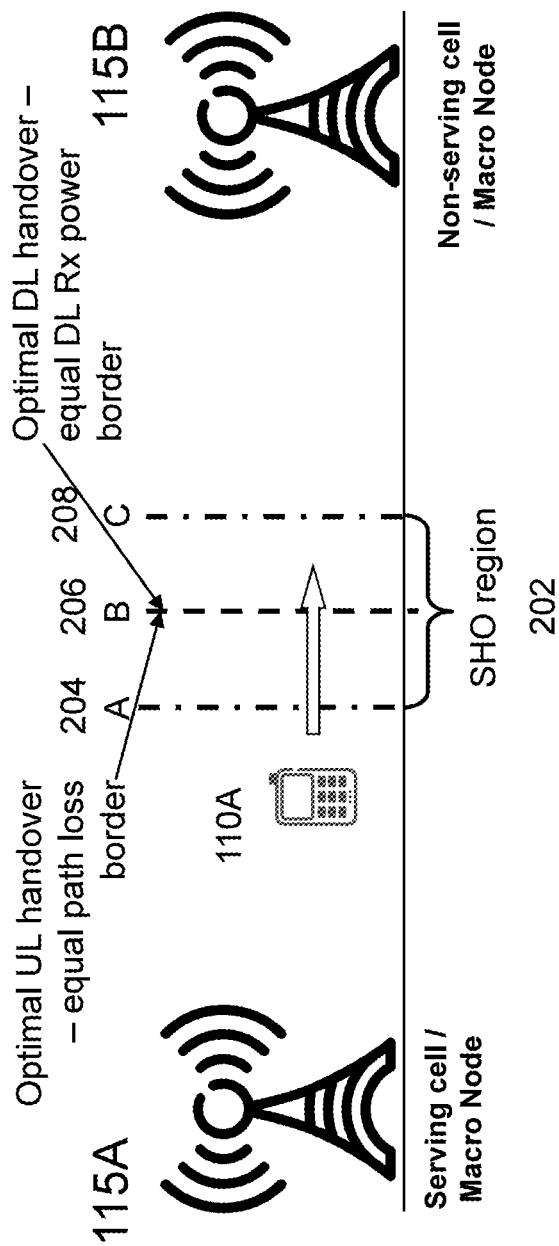
FIG. 2 illustrates a traditional HSPA deployment scenario with two radio network nodes having similar transmit power levels, in accordance with certain embodiments.
Figure 3:
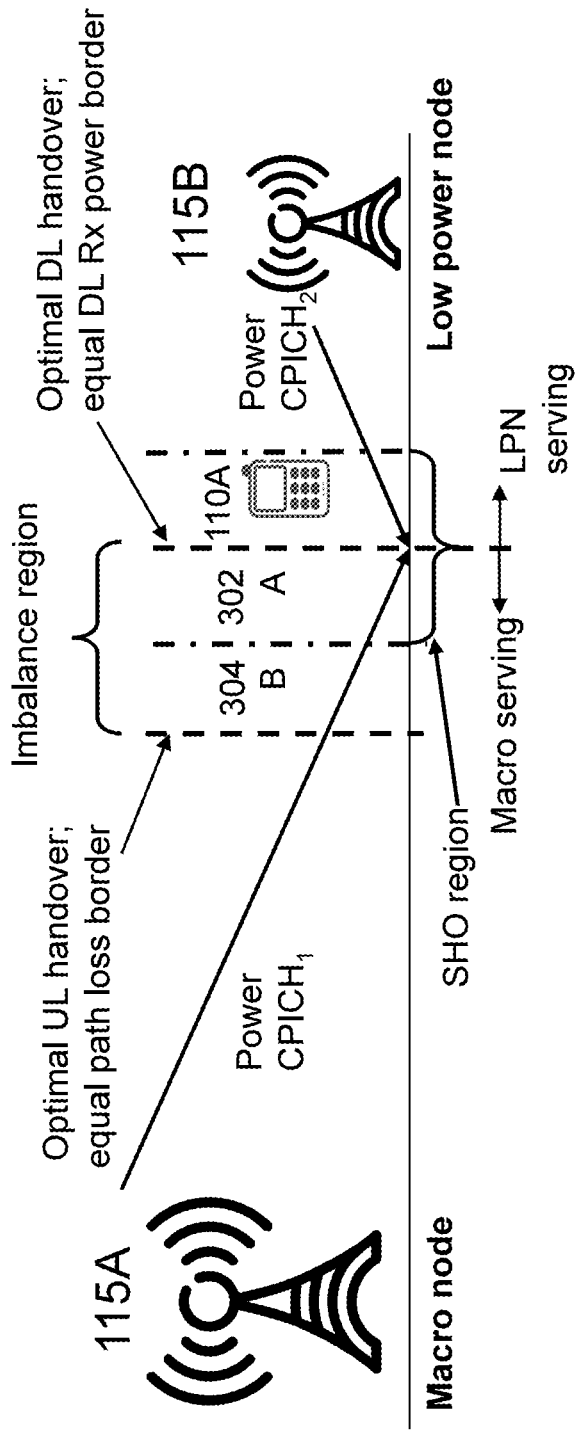
FIG. 3 illustrates a HSPA deployment scenario with two radio network nodes having different transmit power levels, in accordance with certain embodiments.
Figure 4:
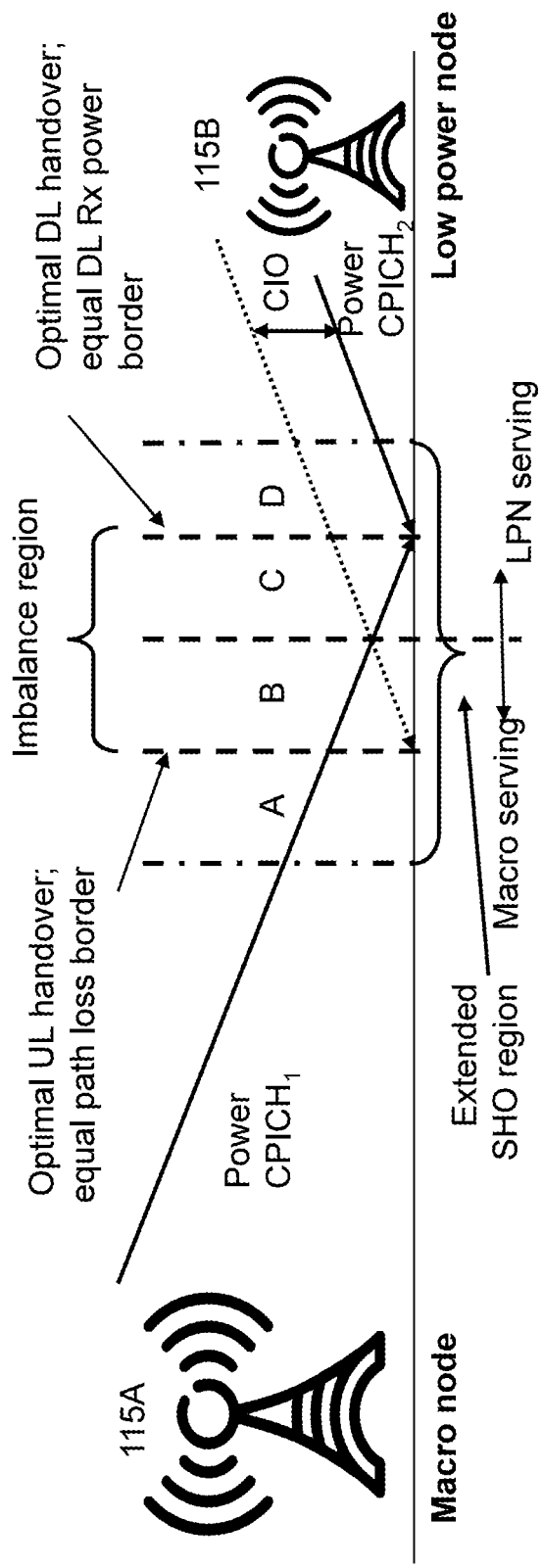
FIG. 4 illustrates SHO operation for HSPA in a heterogeneous deployment with range extension, in accordance with certain embodiments.
Figure 5:
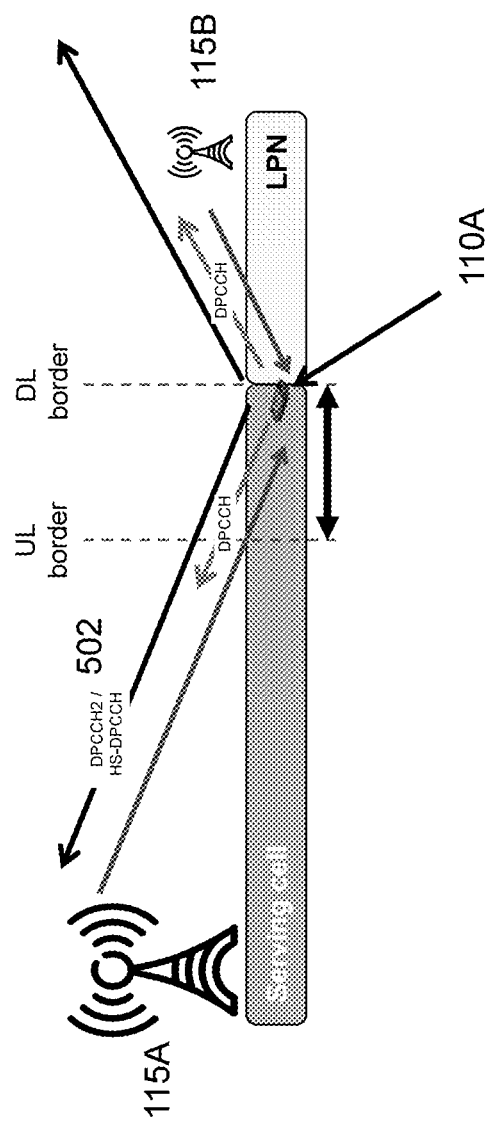
FIG. 5 illustrates a secondary pilot channel based solution for reception of essential control information on the serving cell side, in accordance with certain embodiments.

FIG. 5 illustrates a secondary pilot based solution for reception of essential control information on the serving cell side, in accordance with certain embodiments. More particularly, FIG. 5 illustrates a macro network node 115A, a LPN 115B, a UE 110A, and a S-DPCCH 502. As illustrated in FIG. 5, macro network node 115A is the serving cell, and low power node 115B is the non-serving cell. In certain embodiments, the S-DPCCH 502 is an uplink control channel used in a soft handover of a UE from a network node to a second network node for communicating transmit power control commands. In operation, S-DPCCH 502 may be used for communicating transmit power control commands during a soft handover of UE 110A from macro node 115A to low power node 115B. In certain embodiments, S-DPCCH 502 may be a dedicated physical control channel2 (DPCCH2) of 3GPP.

In certain embodiments, S-DPCCH is power controlled only by serving macro cell 115A, and thus its reception at serving macro cell 115A is guaranteed. In addition, S-DPCCH 502 may be added as the phase reference or reference of power (or amplitude) of one or more channels. For example, S-DPCCH 502 may be the phase reference of HS-DPCCH carrying HARQ ACK/NACK feedback for HSDPA. S-DPCCH 502 may also be the reference of power (or amplitude) setting of HS-DPCCH. Thus, the transmit power (or amplitude) of HS-DPCCH may be related to that of S-DPCCH 502 by an offset value. Furthermore, the HS-DPCCH transmit power may be set relative to S-DPCCH 502. As a result, HS-DPCCH reception at serving macro 115A can be made reliable.

To make the proposed solution based on S-DPCCH 502 work, it is important that uplink TPC works reliably to guarantee the S-DPCCH 502 received SINR at serving macro cell 115A. The uplink TPC command is carried in the downlink Fractional Dedicated Physical Channel (F-DPCH). Currently, the F-DPCH is power controlled by the downlink TPC commands carried in the conventional DPCCH. Note that DPCCH is still essentially power controlled toward LPN 115B, and thus its reception at serving macro network node 115A might be problematic. As a result, F-DPCH transmit power level might not be set properly to ensure that UL TPC commands are delivered to UE 110A reliably. This might result in the secondary pilot based solution being less effective.

The present disclosure contemplates various embodiments that may address these and other problems associated with DL/UL communication that may arise when UE 110A is connected to several nodes with different link quality, and important control information needs to be received by UE 110A or a network node over a potentially weak link. The described embodiments may provide certain advantages. For example, the described embodiments may improve UL control channels when the communication link between UE 110A and the intended receiving network node (e.g., a base station of the serving cell, such as macro network node 115A) is weak. As another example, the power control of S-DPCCH 502 may be improved, and reliable reception of essential UL control information in relevant nodes may be ensured when the communication link is weak because another UL link in the active set is stronger, and hence dictates the power control mechanism. As yet another example, certain embodiments may provide improvements in delivery of uplink scheduling information, such as the "Happy Bit," so that it can be received reliably in serving macro cell 115A.

As described above, in a WCDMA system, a UE 110A in SHO is power-controlled by the best uplink cell. If the best UL is a non-serving cell, such as LPN 115B, one problem is how to ensure that important control information can be reliably received at the serving macro base station 115A. The problem of weak links becomes particularly pronounced when the imbalance between the best UL and DL becomes large, such as in heterogeneous networks or multi-flow operation. In existing systems, the conventional DPCCH carries DL TPC commands for both macro network node 115A and LPN 115B's F-DPCH. As described above, in the imbalance region, DPCCH is power controlled toward LPN 115B, and its reception at the macro base station 115A might be poor.

In certain embodiments of the present disclosure, the new pilot channel S-DPCCH 502 carries the DL TPC commands for controlling the F-DPCH associated with macro node 115A. Since S-DPCCH 502 is power controlled toward macro node 115A, the DL TPC commands carried in S-DPCCH 502 can be received reliably at macro node 115A. With reliable DL TPC commands, the transmit power of the F-DPCH transmitted by macro node 115A can be set sufficiently, and thus the F-DPCH associated with macro node 115A can reach UE 110A with sufficient quality. As a result, the UL TPC commands carried in the F-DPCH associated with macro node 115A for power controlling S-DPCCH 502 can be reliably received, and the transmit power of S-DPCCH 502 can be set at an adequate level. Ultimately, S-DPCCH 502 will be received at a sufficient power level at macro node 115A. Since HS-DPCCH uses S-DPCCH 502 as the phase reference, and also as the basis for setting the transmit power (or amplitude) level, the HS-DPCCH will also reach macro base station 115A with sufficient signal quality.

The present disclosure also contemplates that the new pilot channel S-DPCCH 502 may be used to carry other types of control signalling, resulting in improvements to existing solutions. For example, currently the EUL scheduling information "Happy Bit" is carried in E-DPDCH. Carrying the EUL scheduling information "Happy Bit" in E-DPDCH may have certain disadvantages, such as unreliable reception at serving macro node 115A. In certain embodiments, the EUL scheduling information "Happy Bit" may be carried by S-DPCCH 502 instead of in E-DPDCH. Carrying the "Happy Bit" on S-DPCCH 502 may provide certain advantages. For example, by carrying the "Happy Bit" on S-DPCCH 502, the serving macro base station 115A can receive this scheduling information reliably.

The present disclosure also contemplates improvements to the manner in which DL TPC commands are determined. Currently, the DL TPC commands are determined based on the power, SIR, or SINR measurement of both the F-DPCH associated with macro node 115A and the F-DPCH associated with LPN 115B. If the power, SIR, or SINR measurement of either macro node 115A or LPN 115B exceeds the target, the DL TPC command is set to "DOWN". If the power, SIR, or SINR measurements of both the F-DPCH associated with macro node 115A and the F-DPCH associated with LPN 115B are lower than the target, the TPC command is set to "UP". Furthermore, according to existing implementations, the TPC command ("UP" or "DOWN") is used for power controlling both the F-DPCH associated with macro node 115A and the F-DPCH associated with LPN 115B.

Certain embodiments may address the problems described above in relation to determining the DL TPC commands. In certain embodiments, a first DL TPC command may be determined for the F-DPCH associated with macro node 115A, and a second DL TPC command may be determined for the F-DPCH associated with LPN 115B. More particularly, the first DL TPC command may be determined based on the F-DPCH associated with macro node 115A, and may be carried in S-DPCCH 502, while the second DL TPC command may be determined based on the F-DPCH associated with LPN 115B, and may be carried in the conventional DPCCH. In certain embodiments, the first DL TPC command may only be used for power controlling the F-DPCH associated with macro node 115A, and the second DL TPC command may only be used for power controlling the F-DPCH associated with LPN 115B.

Figure 6:
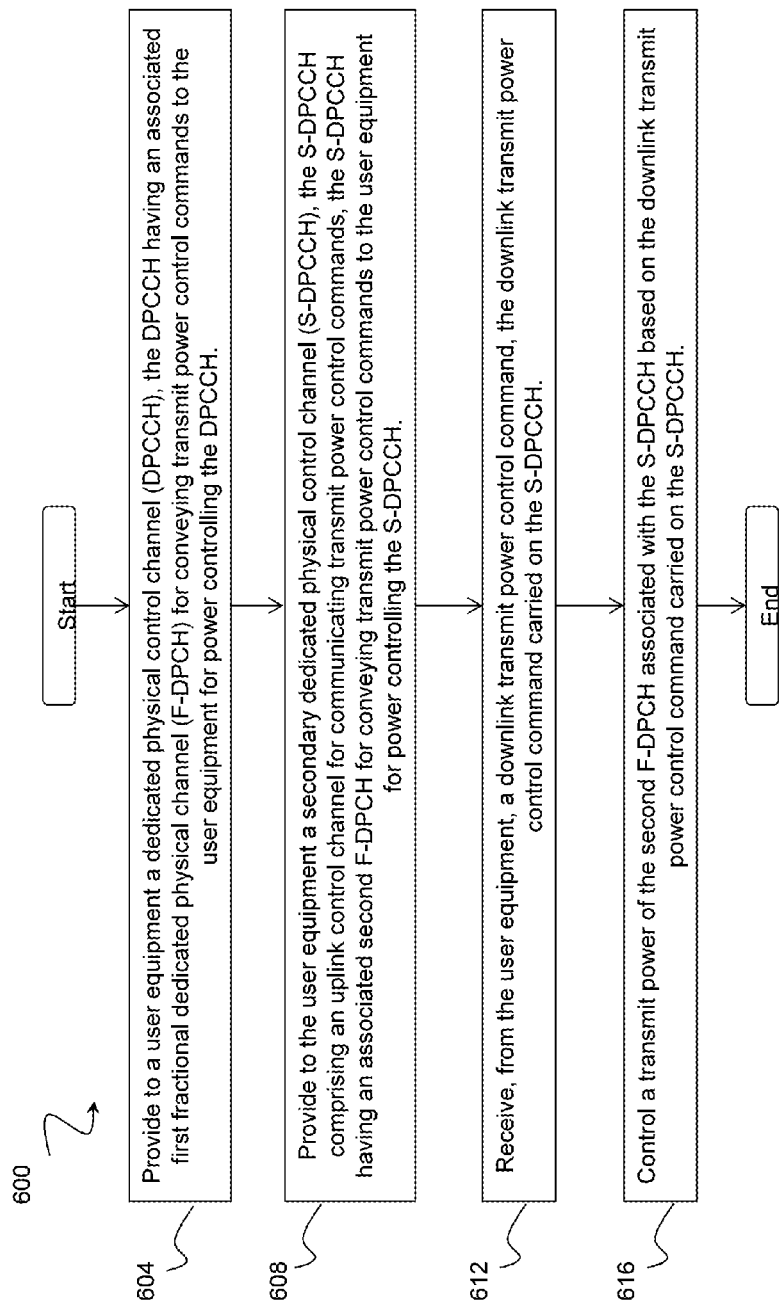
FIG. 6 is a flow diagram illustrating an example method in a network node, according to a particular embodiment.

FIG. 6 is a flow diagram illustrating an example method in a network node, according to a particular embodiment. The method begins at step 604, when the network node provides to a user equipment a dedicated physical control channel (DPCCH). The DPCCH has an associated first fractional dedicated physical channel (F-DPCH) for conveying transmit power control commands to the user equipment for power controlling the DPCCH. In certain embodiments, the network node may be a serving cell.

At step 608, the network node provides to the user equipment a secondary dedicated physical control channel (S-DPCCH). The S-DPCCH is an uplink control channel for communicating transmit power control commands. The S-DPCCH has an associated second F-DPCH for conveying transmit power control commands to the user equipment for power controlling the S-DPCCH. In certain embodiments, the S-DPCCH may be power controlled only by the network node. The network node may use the S-DPCCH as a phase reference for one or more channels, and/or as a basis for setting the transmit power or amplitude level for one or more channels.

At step 612, the network node receives, from the user equipment, a downlink transmit power control command. The downlink transmit power control command is carried on the S-DPCCH. In certain embodiments, the network node may communicate to the user equipment an uplink transmit power control command on a downlink connection with the user equipment. The uplink transmit power control command may be for power controlling the S-DPCCH. In certain embodiments, the network node may receive additional control signaling on the S-DPCCH.

At step 616, the network node controls a transmit power of the second F-DPCH associated with the S-DPCCH based on the downlink transmit power control command carried on the S-DPCCH. In certain embodiments, the network node may control a transmit power of the first F-DPCH associated with the DPCCH based on the downlink transmit power control command carried on the S-DPCCH.

Figure 7:
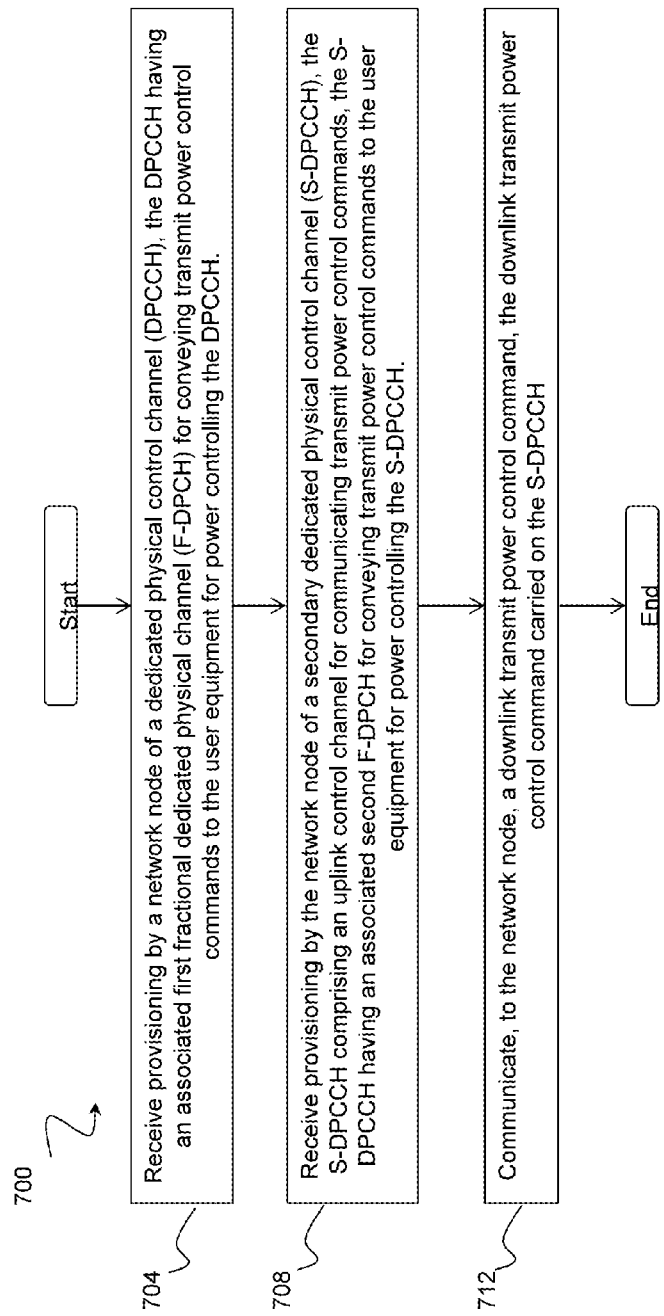
FIG. 7 is a flow diagram illustrating an example method in a user equipment, according to a particular embodiment.

FIG. 7 is a flow diagram illustrating an example method in a user equipment, according to a particular embodiment. The method begins at step 704, when the user equipment receives provisioning by a network node of a dedicated physical control channel (DPCCH). The DPCCH has an associated first fractional dedicated physical channel (F-DPCH) for conveying transmit power control commands to the user equipment for power controlling the DPCCH. In certain embodiments, the network node may be a serving cell.

At step 708, the user equipment receives provisioning by the network node of a secondary dedicated physical control channel (S-DPCCH). The S-DPCCH is an uplink control channel for communicating transmit power control commands. The S-DPCCH has an associated second F-DPCH for conveying transmit power control commands to the user equipment for power controlling the S-DPCCH. In certain embodiments, the S-DPCCH may be power controlled only by the network node. The S-DPCCH may be a phase reference for one or more channels, and/or a basis for setting the transmit power or amplitude level for one or more channels.

At step 712, the user equipment communicates to the network node a downlink transmit power control command. The downlink transmit power control command is carried on the S-DPCCH. In certain embodiments, the downlink transmit power control command carried on the S-DPCCH is a first downlink transmit power control command. The first downlink transmit power control command may be used by the network node for controlling a transmit power of the second F-DPCH. The user equipment may determine the first downlink transmit power control command based at least in part on one or more of a power, a signal-to-interference ratio, and a signal-to-interference-and-noise ratio of the second F-DPCH. In certain embodiments, the user equipment may determine a second downlink transmit power control command based at least in part on one or more of a power, a signal-to-interference ratio, and a signal-to-interference-and-noise ratio of a third F-DPCH associated with the DPCCH and transmitted by a second network node. The second downlink transmit power control command may be used by the second network node for controlling a transmit power of the third F-DPCH. The user equipment may communicate, to the second network node, the second downlink transmit power control command, the second downlink transmit power control command carried on the DPCCH. The second network node may be a non-serving cell.

In certain embodiments, the user equipment may receive an uplink transmit power control command on a downlink connection with the network node. The uplink transmit power control command may be for power controlling the S-DPCCH. In certain embodiments, the S-DPCCH may carry additional control signaling.

Figure 8:
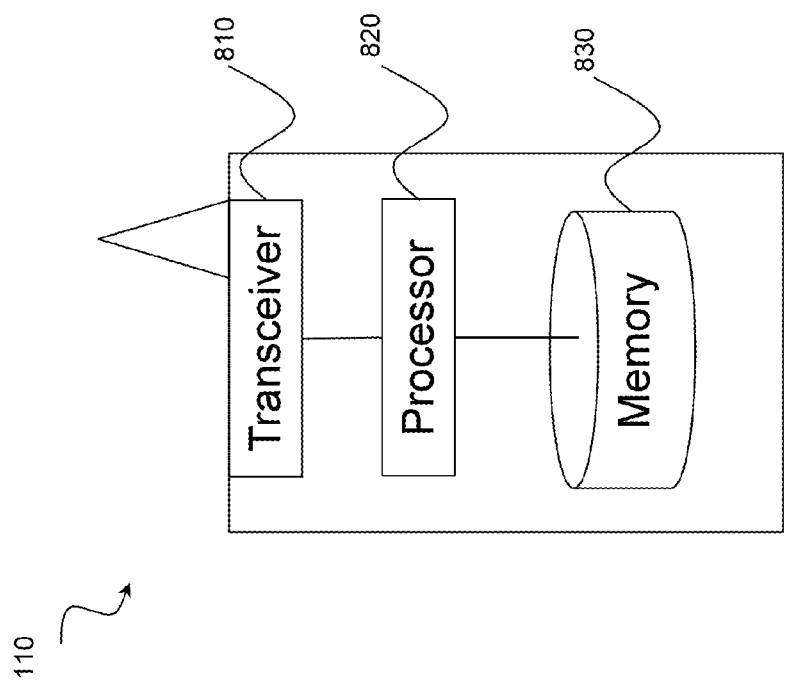
FIG. 8 is a block diagram illustrating certain embodiments of a wireless device.

FIG. 8 is a block diagram illustrating certain embodiments of a wireless device 110. Examples of wireless device 110 include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or another device that can provide wireless communication. A wireless device 110 may also be referred to as user equipment (UE), a station (STA), a device, or a terminal in some embodiments. Wireless device 110 includes transceiver 810, processor 820, and memory 830. In some embodiments, transceiver 810 facilitates transmitting wireless signals to and receiving wireless signals from radio network node 120 (e.g., via an antenna), processor 820 executes instructions to provide some or all of the functionality described above as being provided by wireless device 110, and memory 830 stores the instructions executed by processor 820.

Processor 820 may include any suitable combination of hardware and software implemented in one or more modules to execute instructions and manipulate data to perform some or all of the described functions of wireless device 110. In some embodiments, processor 820 may include, for example, one or more computers, one or more programmable logic devices, one or more central processing units (CPUs), one or more microprocessors, one or more applications, other logic, and/or any suitable combination of the preceding. Processor 820 may include analog and/or digital circuitry configured to perform some or all of the described functions of mobile device 105. For example, processor 820 may include resistors, capacitors, inductors, transistors, diodes, and/or any other suitable circuit components.

Memory 830 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110 may include additional components beyond those shown in FIG. 8 that may be responsible for providing certain aspects of the wireless device's functionality, including any of the functionality described above and/or any additional functionality (including any functionality necessary to support the solution described above).

In certain embodiments, wireless device 110 may include a determining module, a communication module, a receiver module, an input module, a display module, and any other suitable modules. The determining module may perform the processing functions of wireless device 110. For example, the determining module may determine a first downlink transmit power control command based at least in part on one or more of a power, a signal-to-interference ratio, and a signal-to-interference-and-noise ratio of the second fractional dedicated physical channel. As another example, the determining module may determine a second downlink transmit power control command based at least in part on one or more of a power, a signal-to-interference ratio, and a signal to interference-and-noise ratio of a third fractional dedicated physical channel associated with the DPCCH and transmitted by a second network node. The determining module may include or be included in processor 820. The determining module may include analog and/or digital circuitry configured to perform any of the functions of the determining module and/or processor 820.

The communication module may perform the transmission functions of wireless device 110. For example, the communication module may communicate to a network node a downlink transmit power control command on the S-DPCCH. The communication module may include a transmitter and/or a transceiver, such as transceiver 810. The communication module may include circuitry configured to wirelessly transmit messages and/or signals. In particular embodiments, the communication module may receive messages and/or signals for transmission from the determining module.

The receiving module may perform the receiving functions of wireless device 110. For example, the receiving module may receive provisioning of a dedicated physical control channel and a secondary dedicated physical control channel. As another example, the receiving module may receive an uplink transmit power control command on a downlink connection with the network node. The receiving module may include a receiver and/or a transceiver. The receiving module may include circuitry configured to wirelessly receive messages and/or signals. In particular embodiments, the receiving module may communicate received messages and/or signals to the determining module.

The input module may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to the determining module.

The display module may present signals on a display of wireless device 110. The display module may include the display and/or any appropriate circuitry and hardware configured to present signals on the display. The display module may receive signals to present on the display from the determining module.

Figure 9:
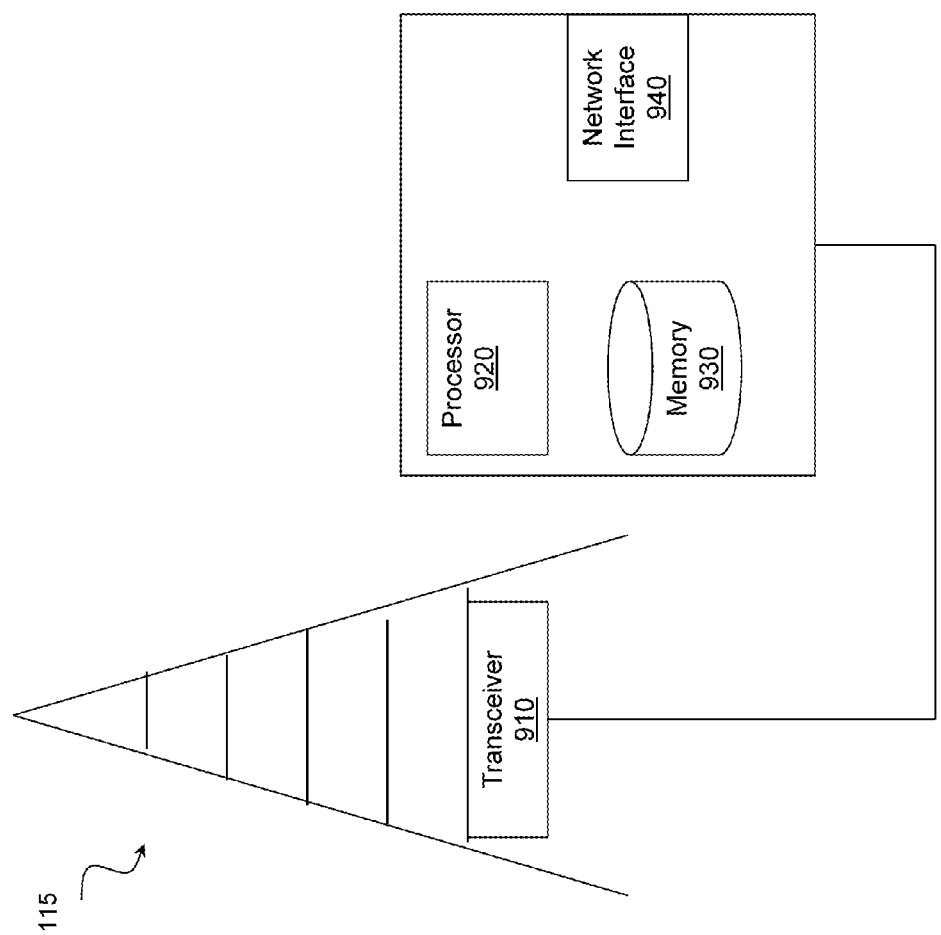
FIG. 9 is a block diagram illustrating certain embodiments of a radio network node.

FIG. 9 is a block diagram illustrating certain embodiments of a radio network node 115. Examples of radio network node 115 include an eNodeB, a node B, a base station, a wireless access point (e.g., a Wi-Fi access point), a low power node, a base transceiver station (BTS), transmission points, transmission nodes, remote RF unit (RRU), remote radio head (RRH), etc. Radio network nodes 115 may be deployed throughout network 100 as a homogenous deployment, heterogeneous deployment, or mixed deployment. A homogeneous deployment may generally describe a deployment made up of the same (or similar) type of radio network nodes 115 and/or similar coverage and cell sizes and inter-site distances. A heterogeneous deployment may generally describe deployments using a variety of types of radio network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Radio network node 115 may include one or more of transceiver 910, processor 920, memory 930, and network interface 940. In some embodiments, transceiver 910 facilitates transmitting wireless signals to and receiving wireless signals from wireless device 110 (e.g., via an antenna), processor 920 executes instructions to provide some or all of the functionality described above as being provided by a radio network node 115, memory 930 stores the instructions executed by processor 920, and network interface 940 communicates signals to backend network components, such as a gateway, switch, router, Internet, Public Switched Telephone Network (PSTN), core network nodes 130, radio network controllers 120, etc.

Processor 920 may include any suitable combination of hardware and software implemented in one or more modules to execute instructions and manipulate data to perform some or all of the described functions of radio network node 115. In some embodiments, processor 920 may include, for example, one or more computers, one or more central processing units (CPUs), one or more microprocessors, one or more applications, and/or other logic.

Memory 930 is generally operable to store instructions, such as a computer program, software, an application including one or more of logic, rules, algorithms, code, tables, etc. and/or other instructions capable of being executed by a processor. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 940 is communicatively coupled to processor 920 and may refer to any suitable device operable to receive input for radio network node 115, send output from radio network node 115, perform suitable processing of the input or output or both, communicate to other devices, or any combination of the preceding. Network interface 940 may include appropriate hardware (e.g., port, modem, network interface card, etc.) and software, including protocol conversion and data processing capabilities, to communicate through a network.

In certain embodiments, radio network node 115 may include a dedicated physical control channel provisioning module, a secondary dedicated physical control channel provisioning module, a determining module, a communication module, a receiving module, and any other suitable modules. In some embodiments, one or more of the dedicated physical control channel provisioning module, secondary dedicated physical control channel provisioning module, communication module, determining module, or other suitable module may be implemented using one or more processors 920 of FIG. 9.

In general, the dedicated physical control channel provisioning module may provide to a user equipment a dedicated physical control channel, and the secondary dedicated physical control channel provisioning module may provide a secondary dedicated physical control channel to the user equipment. In certain embodiments, the functions of the dedicated physical control channel module and the secondary dedicated physical control module may be combined into a single module. In general, the determining module may perform the processing functions of radio network node 115. For example, the determining module may control a transmit power of the second fractional dedicated physical channel associated with the secondary dedicated physical control channel based on a downlink transmit power control command carried on the S-DPCCH. The determining module may include or be included in processor 920. The determining module may include analog and/or digital circuitry configured to perform any of the functions of the determining module and/or processor 920.

The communication module may perform the transmission functions of radio network node 115. For example, the communication module may communicate to a user equipment an uplink transmit power control command on a downlink connection with the user equipment. The communication module may include a transmitter and/or a transceiver, such as transceiver 910. The communication module may include circuitry configured to wirelessly transmit messages and/or signals. In particular embodiments, the communication module may receive messages and/or signals for transmission from the determining module.

The receiving module may perform the receiving functions of radio network node 115. For example, the receiving module may receive a downlink transmit power control command from a user equipment on the S-DPCCH. As another example, the receiving module may receive additional control signaling on the S-DPCCH. The receiving module may include a receiver and/or a transceiver. The receiving module may include circuitry configured to wirelessly receive messages and/or signals. In particular embodiments, the receiving module may communicate received messages and/or signals to the determining module.

Other embodiments of radio network node 115 may include additional components beyond those shown in FIG. 9 that may be responsible for providing certain aspects of the radio network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

Figure 10:
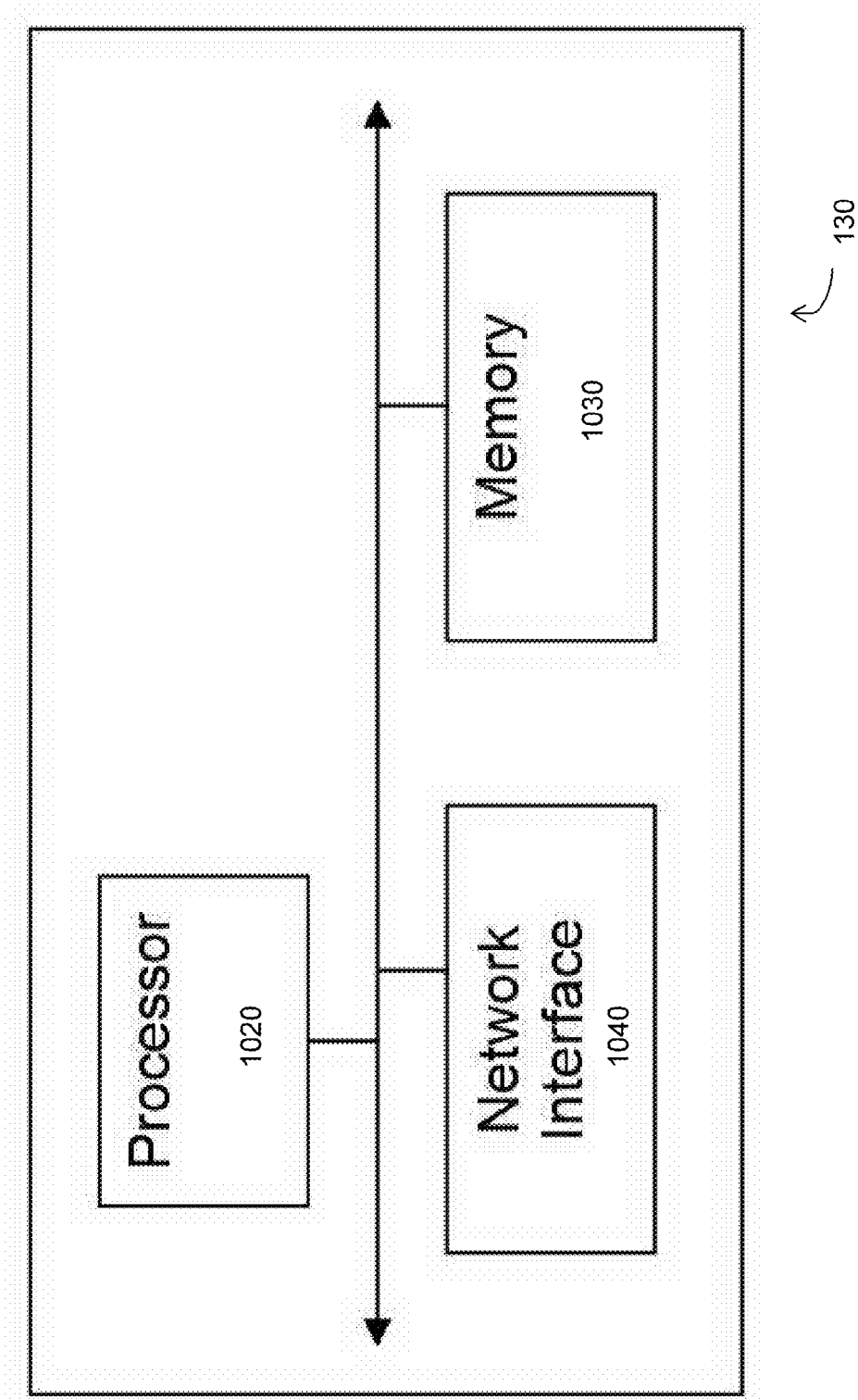
FIG. 10 is a block diagram illustrating certain embodiments of a core network node.

FIG. 10 is a block diagram illustrating certain embodiments of a radio network controller 120 or core network node 130. Examples of network nodes can include a mobile switching center (MSC), a serving GPRS support node (SGSN), a mobility management entity (MME), a radio network controller (RNC), a base station controller (BSC), and so on. The network node includes processor 1020, memory 1030, and network interface 1040. In some embodiments, processor 1020 executes instructions to provide some or all of the functionality described above as being provided by the network node, memory 1030 stores the instructions executed by processor 1020, and network interface 1040 communicates signals to a suitable node, such as a gateway, switch, router, Internet, Public Switched Telephone Network (PSTN), radio network nodes 115, radio network controllers 120, core network nodes 130, etc.

Processor 1020 may include any suitable combination of hardware and software implemented in one or more modules to execute instructions and manipulate data to perform some or all of the described functions of the network node. In some embodiments, processor 1020 may include, for example, one or more computers, one or more central processing units (CPUs), one or more microprocessors, one or more applications, and/or other logic.

Memory 1030 is generally operable to store instructions, such as a computer program, software, an application including one or more of logic, rules, algorithms, code, tables, etc. and/or other instructions capable of being executed by a processor. Examples of memory 1030 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1040 is communicatively coupled to processor 1020 and may refer to any suitable device operable to receive input for the network node, send output from the network node, perform suitable processing of the input or output or both, communicate to other devices, or any combination of the preceding. Network interface 1040 may include appropriate hardware (e.g., port, modem, network interface card, etc.) and software, including protocol conversion and data processing capabilities, to communicate through a network.

Other embodiments of the network node may include additional components beyond those shown in FIG. 10 that may be responsible for providing certain aspects of the network node's functionality, including any of the functionality described above and/or any additional functionality (including any functionality necessary to support the solution described above).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
HSPA High Speed Packet Access
HSDPA High Speed Downlink Packet Access EUL Enhanced Uplink
DPCCH Dedicated Physical Control Channel (the conventional uplink pilot channel+DL TPC commands)
DPCCH2 Dedicated Physical Control Channel2
S-DPCCH Secondary Dedicated Physical Control Channel (the new proposed secondary uplink pilot channel+ DL TPC commands for Macro F-PCH)
E-DPDCH E-DCH Dedicated Physical Data Channel
E-DPCCH E-DCH Dedicated Physical Control Channel
HS-DPCCH High Speed Downlink Packet Access
MIMO Multiple input multiple output
HARQ Hybrid automatic repeat request
NAK Negative acknowledgement
ACK Positive acknowledgement
E-RGCH E-DCH Relative Grant Channel
TTI Transmission Time Interval
RNC Radio Network Controller
RRC Radio Resource Control
LPN Low-power node
RRU Remote Radio Unit
CPICH Common Pilot Channel
CIO Cell Individual Offset
F-DPCH Fractional Dedicated Physical Channel
HS-SCCH Shared Control Channel for HS-DSCH
E-AGCH E-DCH Absolute Grant Channel
SIR Signal-to-interference ratio
Tx Transmit
Rx Receive
TBS Transport block size
RLC Radio Link Control
WCDMA Wideband Code Division Multiple Access
SHO Soft handover
UL Uplink
DL Downlink
TPC Transmit power control
ILPC Inner-loop power control
OLPC Outer-loop power control

The invention claimed is:

1. A method in a network node, comprising:
providing to a user equipment a dedicated physical control channel (DPCCH), the DPCCH being associated with a first fractional dedicated physical channel (F-DPCH) for conveying transmit power control commands to the user equipment for power controlling the DPCCH;
providing to the user equipment a secondary dedicated physical control channel (S-DPCCH), the S-DPCCH comprising an uplink control channel for communicating transmit power control commands, the S-DPCCH being associated with a second F-DPCH for conveying transmit power control commands to the user equipment for power controlling the S-DPCCH;
receiving, from the user equipment, a downlink transmit power control command, the downlink transmit power control command carried on the S-DPCCH;
controlling a transmit power of the second F-DPCH associated with the S-DPCCH based on the downlink transmit power control command carried on the S-DPCCH; and
controlling a transmit power of the first F-DPCH associated with the DPCCH based on the downlink transmit power control command carried on the S-DPCCH.

2. The method of claim 1, wherein the network node is a serving cell.

3. The method of claim 1, further comprising: communicating to the user equipment an uplink transmit power control command on a downlink connection with the user equipment, the uplink transmit power control command for power controlling the S-DPCCH.

4. The method of claim 1, wherein the S-DPCCH is power controlled only by the network node.

5. The method of claim 1, further comprising using the S-DPCCH as a phase reference for one or more channels.

6. The method of claim 1, further comprising using the S-DPCCH as a basis for setting the transmit power or amplitude level for one or more channels.

7. The method of claim 1, further comprising receiving additional control signaling on the S-DPCCH.

8. A network node, comprising:
processing circuitry configured to:
provide to a user equipment a dedicated physical control channel (DPCCH), the DPCCH being associated with a first fractional dedicated physical channel (F-DPCH) for conveying transmit power control commands to the user equipment for power controlling the DPCCH;
provide to the user equipment a secondary dedicated physical control channel (S-DPCCH), the S-DPCCH comprising an uplink control channel for communicating transmit power control commands, the S-DPCCH being associated with a second F-DPCH for conveying transmit power control commands to the user equipment for power controlling the S-DPCCH;
receive, from the user equipment, a downlink transmit power control command, the downlink transmit power control command carried on the S-DPCCH;
control a transmit power of the second F-DPCH associated with the S-DPCCH based on the downlink transmit power control command carried on the S-DPCCH; and
control a transmit power of the first F-DPCH associated with the DPCCH based on the downlink transmit power control command carried on the S-DPCCH.

9. The network node of claim 8, wherein the network node is a serving cell.

10. The network node of claim 8, wherein the processing circuitry is further configured to communicate to the user equipment an uplink transmit power control command on a downlink connection with the user equipment, the uplink transmit power control command for power controlling the S-DPCCH.

11. The network node of claim 8, wherein the S-DPCCH is power controlled only by the network node.

12. The network node of claim 8, wherein the processing circuitry is further configured to use the S-DPCCH as a phase reference for one or more channels.

13. The network node of claim 8, wherein the processing circuitry is further configured to use the S-DPCCH as a basis for setting the transmit power or amplitude level for one or more channels.

14. The network node of claim 8, wherein the processing circuitry is further configured to receive additional control signaling on the S-DPCCH.

15. A method in a user equipment, comprising:
receiving provisioning by a network node of a dedicated physical control channel (DPCCH), the DPCCH being associated with a first fractional dedicated physical channel (F-DPCH) for conveying transmit power control commands to the user equipment for power controlling the DPCCH;
receiving provisioning by the network node of a secondary dedicated physical control channel (S-DPCCH), the S-DPCCH comprising an uplink control channel for communicating transmit power control commands, the S-DPCCH being associated with a second F-DPCH for conveying transmit power control commands to the user equipment for power controlling the S-DPCCH; and communicating, to the network node, a downlink transmit power control command, the downlink transmit power control command carried on the S-DPCCH;

wherein the downlink transmit power control command carried on the S-DPCCH is a first downlink transmit power control command, the first downlink transmit power control command used by the network node for controlling a transmit power of the second F-DPCH, and the method further comprises:

determining the first downlink transmit power control command based at least in part on one or more of a power, a signal-to-interference ratio, and a signal-to-interference-and-noise ratio of the second F-DPCH.

16. The method of claim 15, further comprising:

determining a second downlink transmit power control command based at least in part on one or more of a power, a signal-to-interference ratio, and a signal-to-interference-and-noise ratio of a third F-DPCH associated with the DPCCH and transmitted by a second network node, the second downlink transmit power control command used by the second network node for controlling a transmit power of the third F-DPCH;

communicating, to the second network node, the second downlink transmit power control command, the second downlink transmit power control command carried on the DPCCH.

17. The method of claim 16, wherein the network node is a serving cell and the second network node is a non-serving cell.

18. The method of claim 15, further comprising receiving an uplink transmit power control command on a downlink connection with the network node, the uplink transmit power control command for power controlling the S-DPCCH.

19. The method of claim 15, wherein the S-DPCCH is power controlled only by the network node.

20. The method of claim 15, wherein the S-DPCCH is a phase reference for one or more channels.

21. The method of claim 15, wherein the S-DPCCH is a basis for setting the transmit power or amplitude level for one or more channels.

22. The method of claim 15, wherein the S-DPCCH is used to carry additional control signaling.

23. A user equipment, comprising:

processing circuitry configured to:

receive provisioning by a network node of a dedicated physical control channel (DPCCH), the DPCCH being associated with a first fractional dedicated physical channel (F-DPCH) for conveying transmit power control commands to the user equipment for power controlling the DPCCH;

receive provisioning by the network node of a secondary dedicated physical control channel (S-DPCCH), the S-DPCCH comprising an uplink control channel for communicating transmit power control commands, the S-DPCCH being associated with a second F-DPCH for conveying transmit power control commands to the user equipment for power controlling the S-DPCCH; and communicate, to the network node, a downlink transmit power control command, the downlink transmit power control command carried on the S-DPCCH;

wherein the downlink transmit power control command carried on the S-DPCCH is a first downlink transmit power control command, the first downlink transmit power control command used by the network node for controlling a transmit power of the second F-DPCH, and the processing circuitry is further configured to:

determine the first downlink transmit power control command based at least in part on one or more of a power, a signal-to-interference ratio, and a signal-to-interference-and-noise ratio of the second F-DPCH.

24. The user equipment of claim 23, wherein the processing circuitry is further configured to:

determine a second downlink transmit power control command based at least in part on one or more of a power, a signal-to-interference ratio, and a signal-to-interference-and-noise ratio of a third F-DPCH associated with the DPCCH and transmitted by a second network node, the second downlink transmit power control command used by the second network node for controlling a transmit power of the third F-DPCH;

communicate, to the second network node, the second downlink transmit power control command, the second downlink transmit power control command carried on the DPCCH.

25. The user equipment of claim 24, wherein the network node is a serving cell and the second network node is a non-serving cell.

26. The user equipment of claim 23, wherein the processing circuitry is further configured to receive an uplink transmit power control command on a downlink connection with the network node, the uplink transmit power control command for power controlling the S-DPCCH.

27. The user equipment of claim 23, wherein the S-DPCCH is power controlled only by the network node.

28. The user equipment of claim 23, wherein the S-DPCCH is a phase reference for one or more channels.

29. The user equipment of claim 23, wherein the S-DPCCH is a basis for setting the transmit power or amplitude level for one or more channels.

30. The user equipment of claim 23, wherein the S-DPCCH is used to carry additional control signaling.

* * * * *